Dec. 29, 1970  E. GRAEBER  3,550,362
CONTROL SYSTEM FOR THE DIRECTION OF MOVEMENT
OF AGRICULTURAL MACHINES
Filed Dec. 23, 1968  9 Sheets-Sheet 1

EWALD GRAEBER
INVENTOR.

BY Karl F. Ross

ATTORNEY

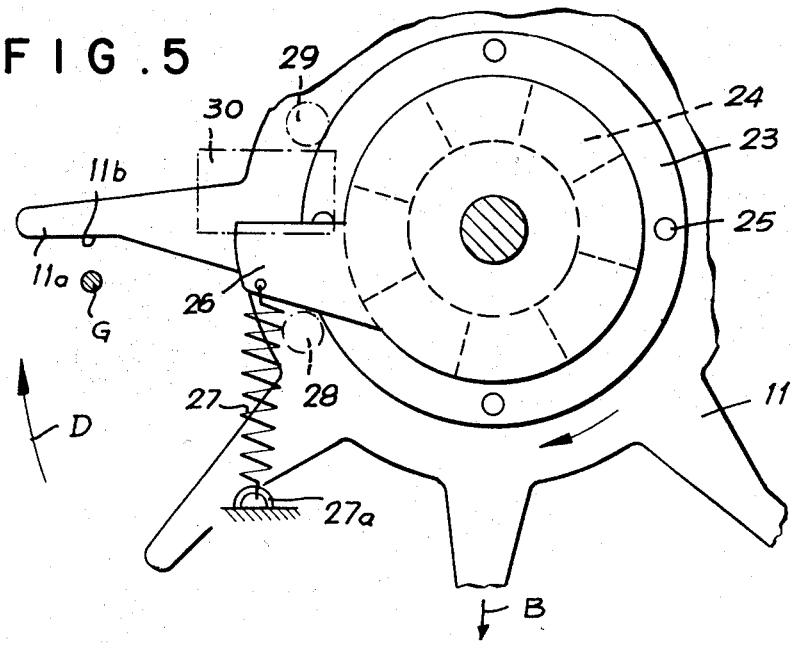
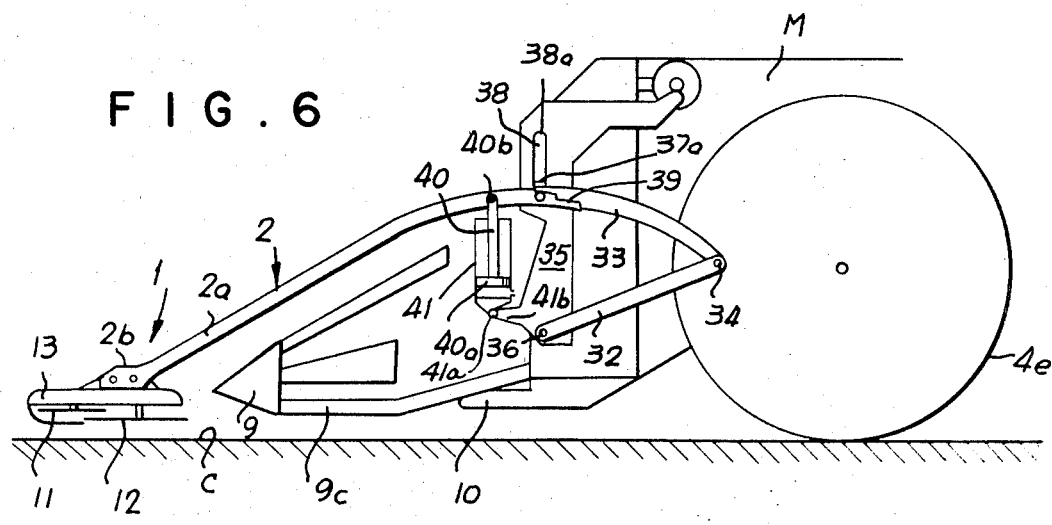

Dec. 29, 1970  E. GRAEBER  3,550,362
CONTROL SYSTEM FOR THE DIRECTION OF MOVEMENT
OF AGRICULTURAL MACHINES
Filed Dec. 23, 1968

EWALD GRAEBER
INVENTOR.

BY  *Karl F. Ross*

ATTORNEY

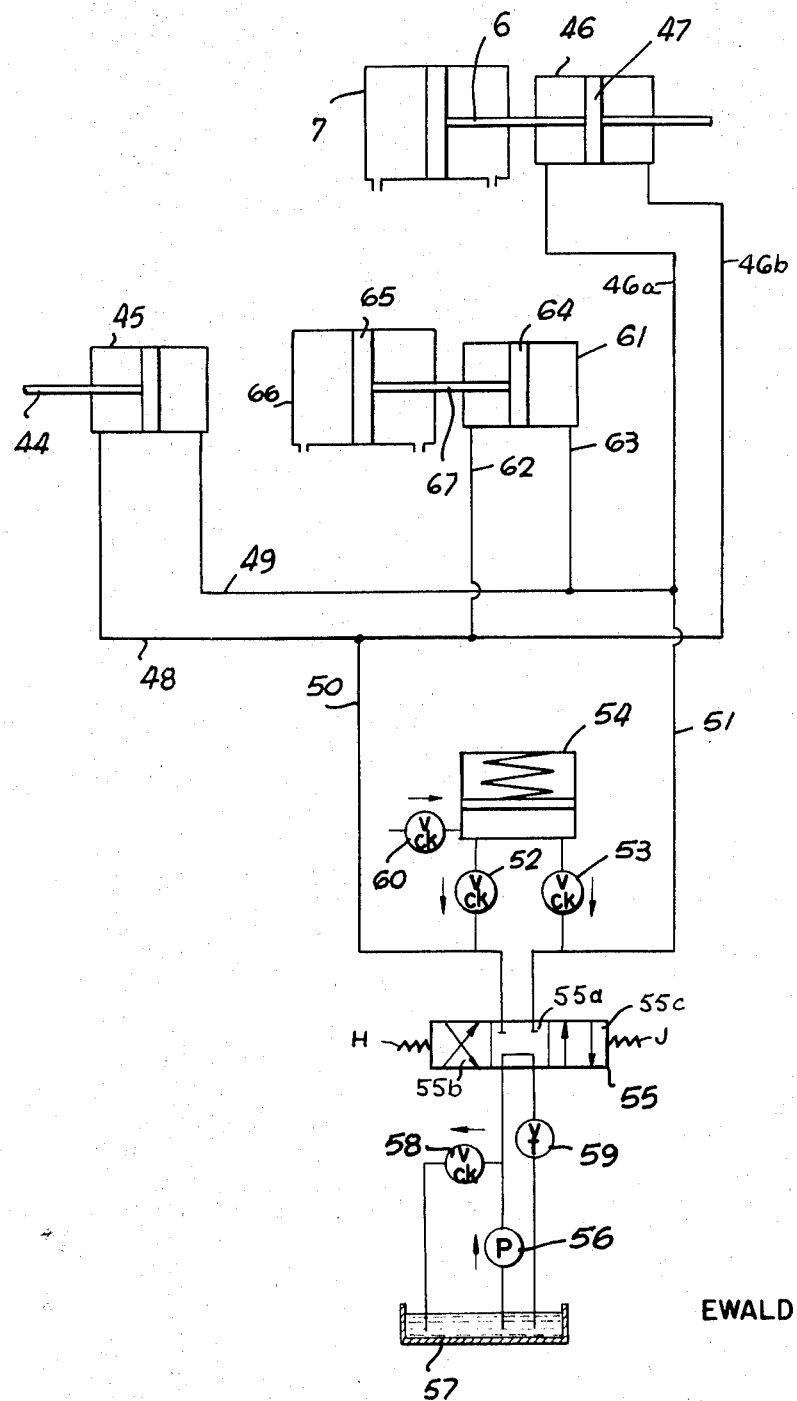

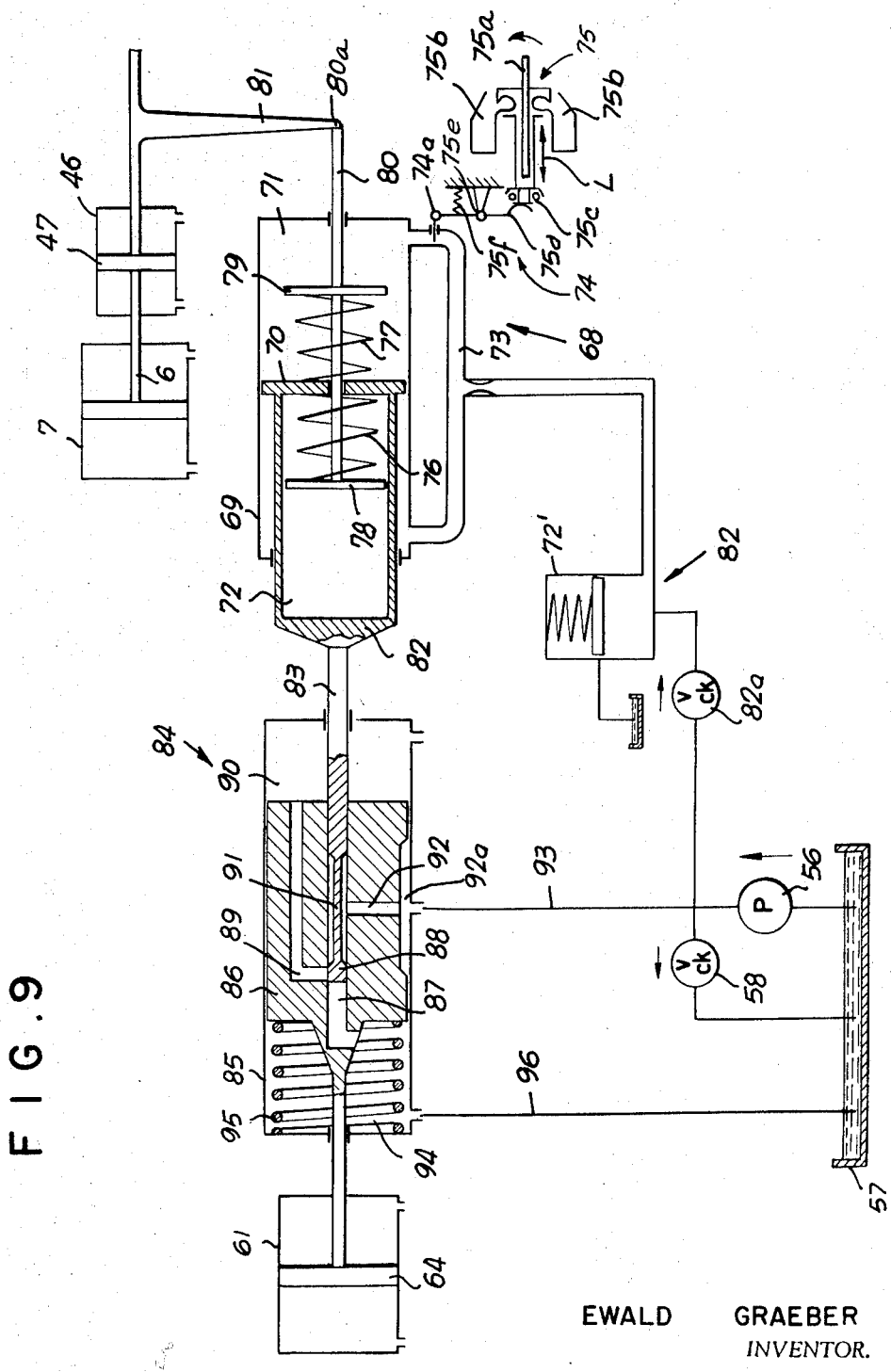

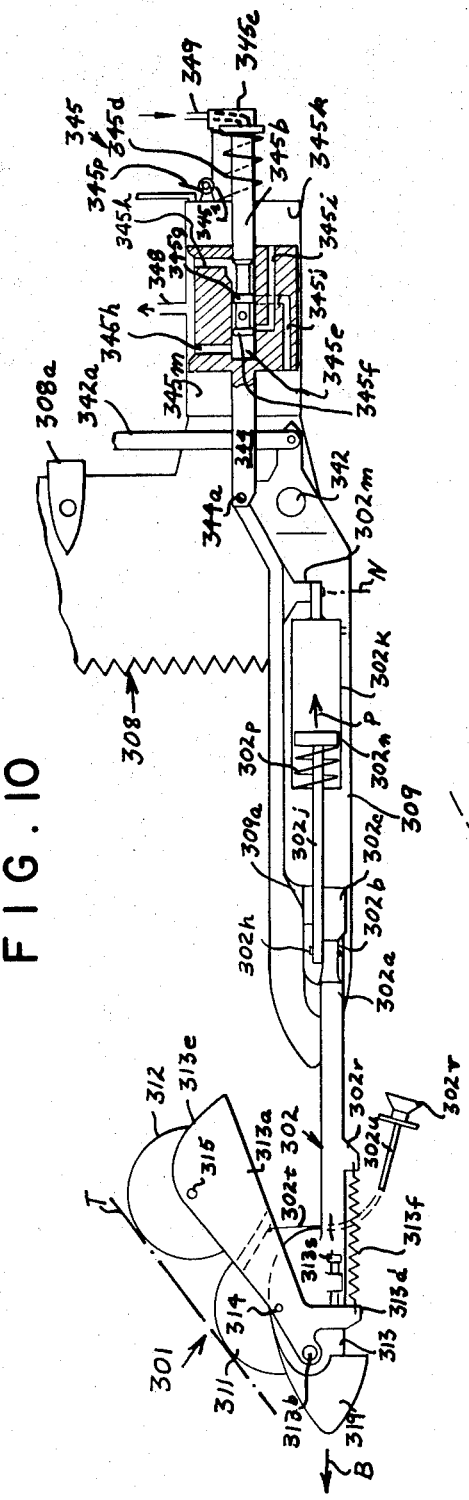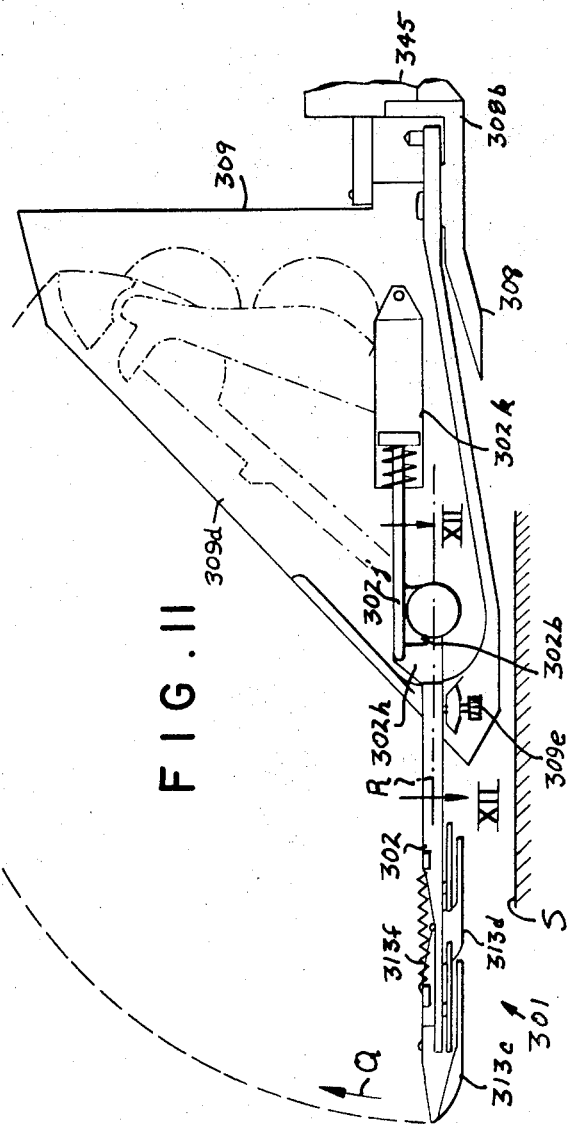

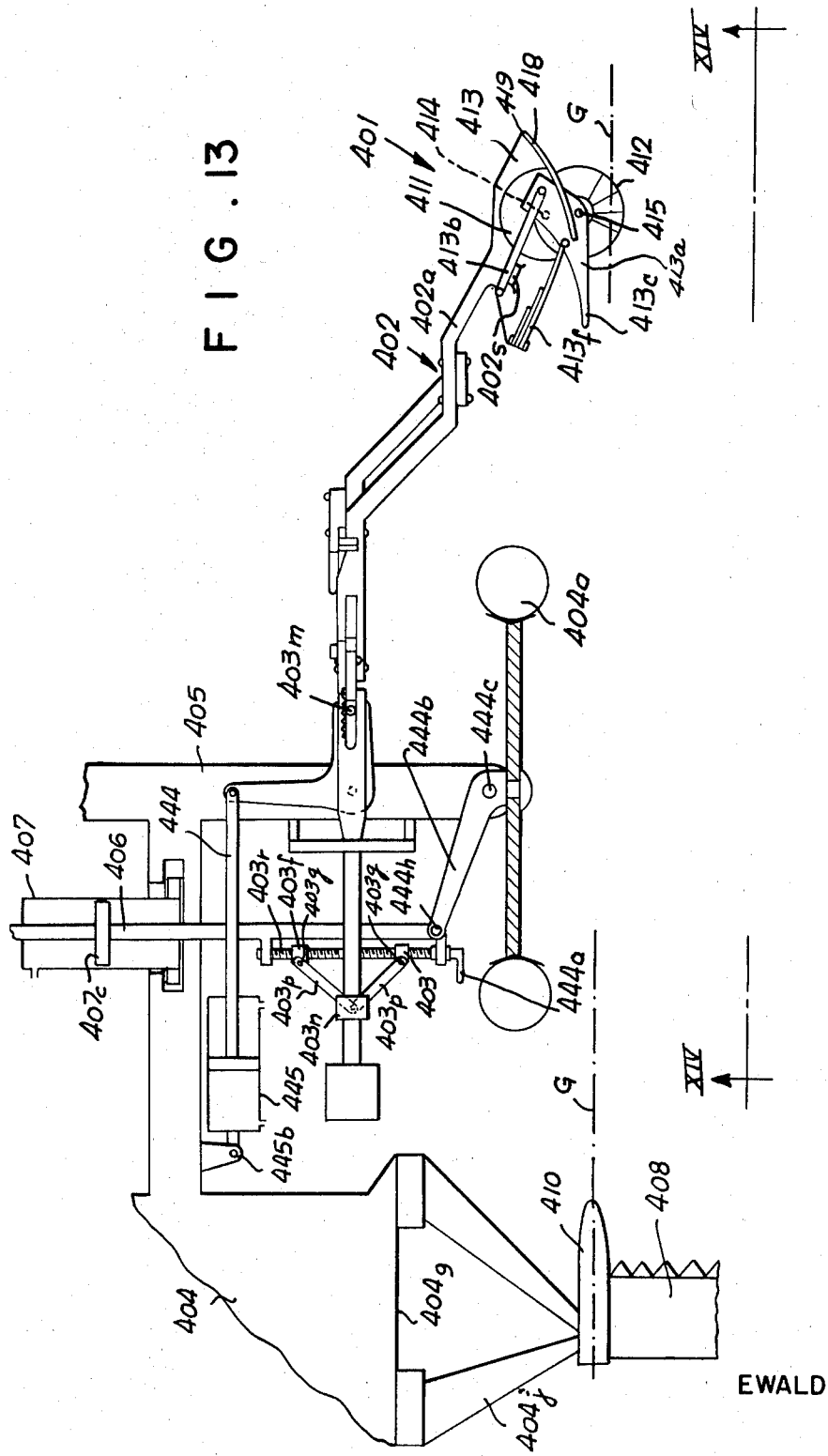

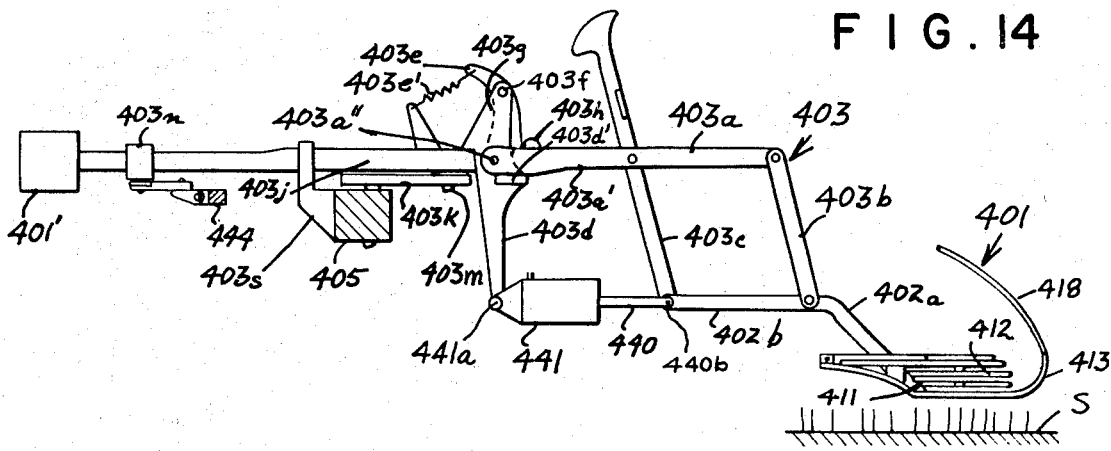
FIG.14
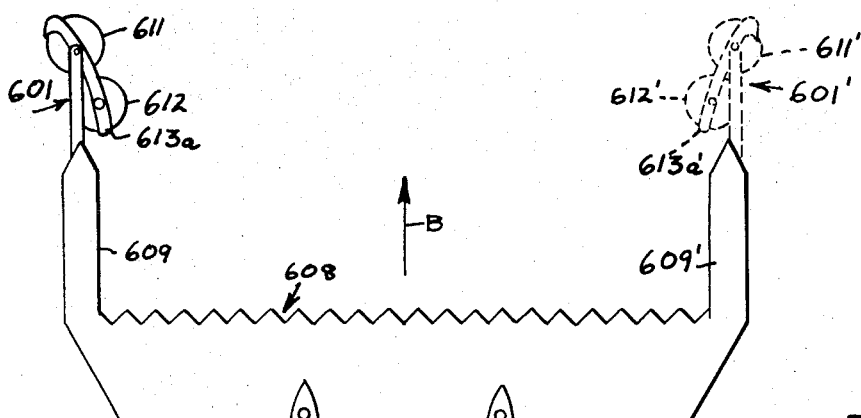
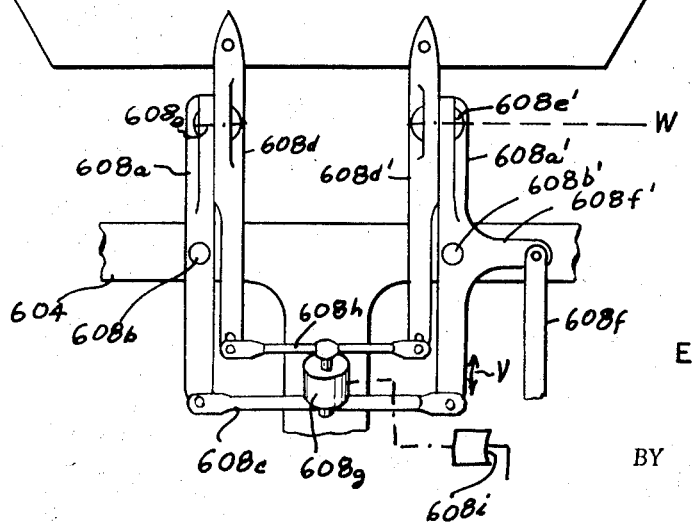
FIG.16
EWALD GRAEBER
INVENTOR.
BY Karl G. ...
ATTORNEY Dec. 29, 1970   E. GRAEBER   3,550,362
CONTROL SYSTEM FOR THE DIRECTION OF MOVEMENT
OF AGRICULTURAL MACHINES
Filed Dec. 23, 1968   9 Sheets-Sheet 9

EWALD GRAEBER
INVENTOR.

BY  *Karl F. Ross*
    Attorney

ATTORNEY

United States Patent Office 3,550,362
Patented Dec. 29, 1970

3,550,362
CONTROL SYSTEM FOR THE DIRECTION OF MOVEMENT OF AGRICULTURAL MACHINES
Ewald Graeber, Waiblingen, Germany, assignor to Maschinenfabrik FAHR AG, Gottmadingen, Germany, a corporation of Germany
Filed Dec. 23, 1968, Ser. No. 785,956
Claims priority, application Germany, Dec. 21, 1967, 1,582,237; Oct. 2, 1968, 1,800,473
Int. Cl. A01d 35/02
U.S. Cl. 56—25                                                 30 Claims

ABSTRACT OF THE DISCLOSURE

A mower assembly for a field harvesting machine which has a sensing head ahead of the sickle bar, the sensing head is responsive to the stalk line for steering the vehicle and includes a pair of star wheels rotatable about substantially vertical axes and staggered transversely of the stalk line such that one of the star wheels is rotated when the stalk line is properly engaged but corrective steering is initiated when neither of the star wheels or both of the star wheels are rotated.

---

My present invention relates to a control system adapted to regulate the direction of movement of an agrcultural machine and, more particularly, a harvesting machine adapted to pass along a row of stalks and for the control of this machine to maintain its path along such row.

It has already been proposed to provide steering-control systems for agricultural machinery, especially harvesting machines, adapted to form a swath in field crops and to be adjusted automatically for continued movement along the predetermined swath. Such machines are generally mower-type harvesters having a cutting horizontal blade or sickle bar which is reciprocated perpendicularly to the direction of movement of the agricultural machine and adapted to cut down the stalks of a field crop directly ahead of the sickle bar, thereby forming a swath in the field crop which is defined at least on one side by the row of standing stalks. Control devices may be provided for automatically to guide the machine along the standing row of stalks for the purpose of decreasing the manpower required for harvesting the crop by eliminating the need for the machine operator to cotninuously adjust the direction of travel of the machine. It will be understood that the complex agricultural machinery used in modern times often requires attention to numerous functional parts; such attention cannot be fully given by the operator if he has to constantly steer the machine at the same time. Hence, in many harvesting systems, at least two operators are required if satisfactory and economical harvesting was to be achieved. By providing automatic control of the direction of travel of the machine, however, such extra personnel can be eliminated. Some earlier systems for the control of such machinery have been provided with slide bodies, stationary feelers or optical sensors to detect the line of the desired direction of travel and to adjust the actual direction of the tractor in accordance with this predetermined direction. Mechanical sensors extending laterally from the machine for engagement with the row of standing stalks adjacent the swath have proved to be ineffective since they generally were so stiff that the stalks were deflected, thereby registering need for adjustment of the direction of travel when, in reality, no such requirement existed. Optical sensing systems proved ineffective because of the greater tendency toward contamination and obscuring of the optical sensor.

It is, therefore, the principal object of the present invention to provide an improved system for controlling an agricultural machine of the general character described earlier.

Another object of this invention is to provide an inexpensive, accurate and disturbance-free control arrangement for regulating the direction of travel of an agricultural machine which is free from the disadvantages mentitoned earlier.

Still another object of this invention is to provide an agricultural machine embodying an improved steering control system which is insensitive to weather conditions, dirt and other contaminants, which is unaffected by changing light conditions, and which can respond either to the standing row of stalks defining a boundary of a swath or the mowed crop for maintaining the desired direction of travel of the agricultural machine.

These and other objects which will be apparent hereinafter, are attainable, in accordance with the present invention, which provides a control arrangement for vehicular agricultural machines, especially agricultural machines of the field harvester type having a mowing arrangement adapted to sever stalks of a crop material along a swath, and responsive either to a row of standing stalks or the cut or overturned crop for regulation of the direction of travel of the agricultural machine along a predetermined guide line; the control system of the present invention is provided with a sensing device comprising at least two rotatable disks individually rotatable and provided with peripheral formations (e.g. teeth or spokes) engageable with a standing row of the crop and located in staggered relationship in the direction of travel. These disks, which are rotatable about approximately vertical or upright axes, co-operate with rotation-detection means responsive to the rotation or absence of rotation of the disks for controlling a vehicle-steering assembly coupled directly or indirectly with the steerable wheels of the machine, e.g. a tractor or self-propelled harvester carrying, drawing or pushing a mowing assembly. The spoked disks, which can be considered to have star-shaped peripheries and to be star wheels, are so arranged that the stalks of the upright row of noncut crop material adjacent the cut swath engage the spokes or teeth of the star wheel and rotate them when the star wheels pass along this row.

In normal operation, failure of either of the star wheels to rotate generates a signal at the rotation-responsive means tending to direct the vehicle toward the side on which the sensing disks are mounted inasmuch as such absence of contact between the standing crop material and the disks indicates a deviation of the vehicle away from the guide line constituted by this row. Under normal operating conditions, requiring no correction, the innermost disk of the staggered star wheels only is engaged by the standing crop material and is rotated while the outer disk fails to engage the stalks and generates no correction signal at the rotation-responsive means. However, when the mobile agricultural machine deviates toward the stand of the crop, both sensing disks will encounter the upright stalks and be rotated, this joint rotation producing an output of the roation-responsive means which energizes the direction-control means of the machine to correct the direction of travel and reestablish the normal condition mentioned earlier.

According to a more specific feature of this invention, each disk is provided with a follower operating a switch or cooperating with two rings of magnetic segments spaced coaxially from one another with a slight gap, one of the rings being fixed to the disk while the other ring is rotatable and is provided with a formation (e.g. a cam or lug) co-operating with the signal generator. When the disk is stationary, no torque is applied to the juxtaposed angularly shiftable ring and no output of the signal generator is produced. When the disk is rotated, the rotated ring affixed to the disk magnetically co-operates with the other ring to produce a torque in the latter which operates a signal generator.

I have found it to be advantageous to provide means responsive to the crop material which is overturned or has been cut by the mower previously, thereby controlling the following path of the agricultural machine in response to the previously formed swath. To this end, I may provide pins or fingers at the ends of the spokes or in place of sprocket-like teeth of the star-wheel disks, these fingers engaging the previously cut crop material. Furthermore, it has been found to be highly advantageous to provide the sensing system, consisting of the aforementioned disks, at one or both ends of the mowing arrangement, preferably upon the stalk separator or swath plate which deflects uncut crop material away from the end of the blade.

The above and other objects, features and advantages of the present invention will become more readily apparent from the following description, reference being made to the accompanying drawing in which:

FIG. 5 is a fragmentary cross-sectional view taken along line V—V in FIG. 4 and showing one of the sensing disks and its rotation-sensing arrangements from above;

FIG. 6 is a side-elevational view, partly in diagrammatic form of the front end of a field-harvesting machine embodying the invention;

FIG. 8 is a hydraulic circuit diagram showing the hydraulic system responding to the star wheels of the sensing disk;

FIG. 9 is a view similar to FIG. 8 of a further control arrangement;

FIG. 10 is a partial diagrammatic elevational view of a control system according to the present invention, seen from above and forming part of a field harvester at the left-hand side of the latter, the unit being in its extended position;

FIG. 11 is a side-elevational view of the unit of FIG. 10 in which the retracted position is shown in dot-dash lines;

FIG. 13 is a partial plan view of a tractor-mounted sickle bar in its laterally retracted position;

FIG. 14 is a cross-section taken along the line XIV—XIV of FIG. 13;

FIG. 16 is a plan view, partly in diagrammatic form, of the front portion of a sickle-bar assembly for a field harvester having two sensing units;

Figure 1:
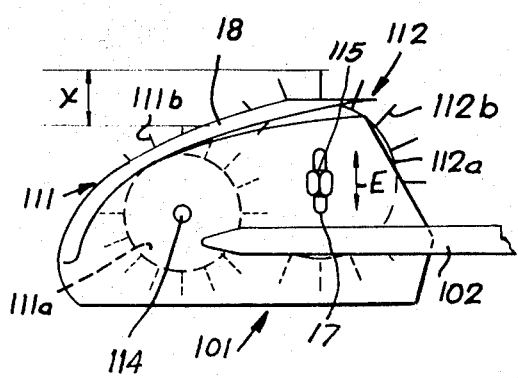
FIG. 1 is a top-plan view of a sensing head at the end of an outrigger arm as shown in FIG. 6, in accordance with the present invention.

Referring first to the overall diagrammatic use of FIGS. 6 and 7, it can be seen that an agricultural machine M of the field-harvesting type has a pair of steerable wheels (one shown at 4a) which are mounted on the steering knuckles 4b of the rear axle 4 of the machine M at a pivot 4c for steering movement in the clockwise or counterclockwise sense about this pivot under the control of a cylinder arrangement 6, 7 which will be described in greater detail hereinafter. A tie rod 4d connects the steerable rear wheels of this harvesting machine. At the front end of the machine, which is provided with engine-driven wheels 4e (one shown), the machine is provided with a sickle bar 8 which is reciprocable in the direction of an arrow A transversely to the direction of machine travel B to cut a swath from the stand of crop material diagrammatically represented at S. The guide line serving to control the direction of the vehicle is represented at G and comprises a row of upright stalks. At the left-hand side of the machine, projecting forwardly of its front end, I have shown a sensing head generally designated 1 which co-operates with the row G of upstanding stalks. A similar sensing arrangement may be provided at the other side of the machine, e.g. at the right-hand side of the sickle bar 8 as seen facing in the direction of movement B of the machine.

The sensing head 1 is carried by an outrigger arm 2 affixed to a toggle-type of linkage generally represented at 3 and by the latter to the housing 4f at the front end of the machine.

Steering of the machine is effected by a hydraulic cylinder 7 which is pivotally mounted at its closed end via a pin 7a to a pedestal 7b fixed to the central body 4g of the machine. The piston 7c of this cylinder is linked by the piston rod 6 to an arm of the steering knuckle 4b at a ball joint 4h. The steering assembly has been generally represented at 5.

Figure 7:
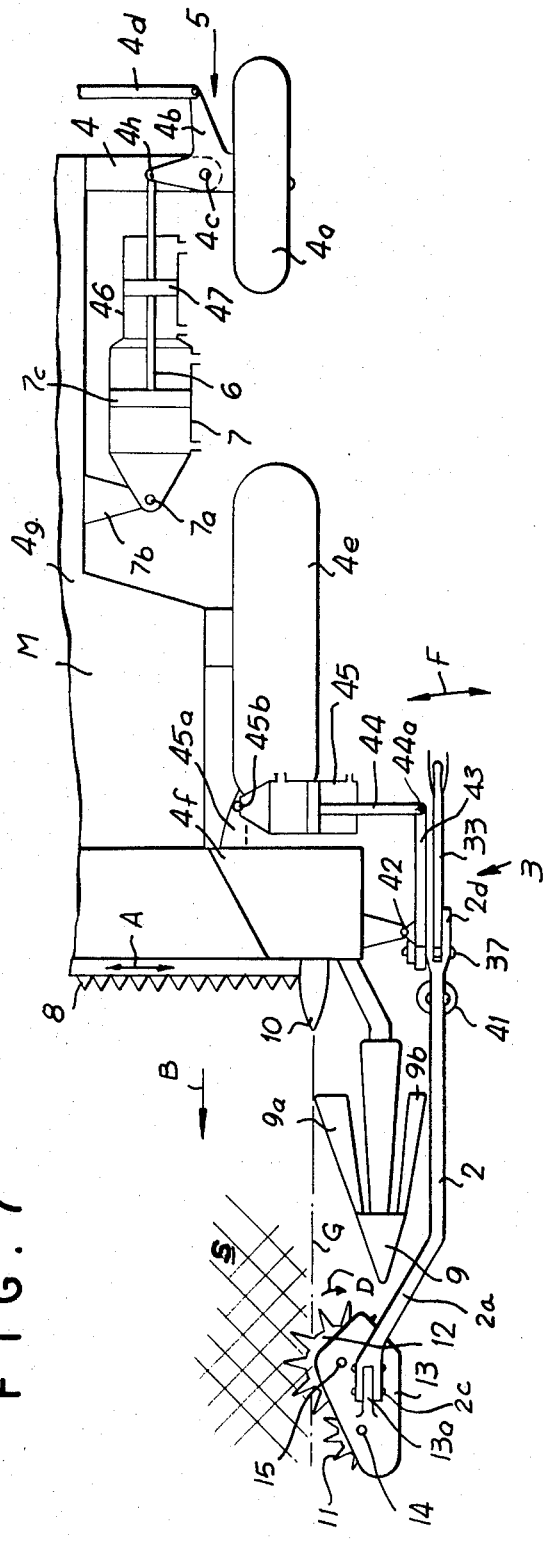
FIG. 7 is a diagrammatic plan view, partly broken away, on the left-hand side of this machine illustrating the cylinder arrangement for controlling the steerable wheels as well as the sensing mechanism.

As will be apparent from FIGS. 6 and 7, the sensing head 1 hangs close to the ground surface C from the outrigger arm 2 which is bowed downwardly from a pivot 37 and has an inwardly bent portion 2a terminating in a bifurcated foot 2b of which a lug 13a of the sensing head is received and is held by pins 2c. At each end of the sickle bar 8, there is located the usual stalk divider 9 which has a pair of deflecting batteries 9a and 9b and is secured by a bar 9c at the front end 4f of the harvester. This swath is defined between the mower feet 10 (one shown) on either end of the sickle bar 8. With the aid of the outrigger arm 2, the head 1 is suspended forwardly of the stalk separator 9 and has its disks 11 and 12, formed as star wheels rotatably mounted on axes 14 and 15 in a support shield 13 formed with a lug 13a. The toothed peripheries extend laterally inwardly beyond the outline of the shield 13 (FIG. 7) so that the disk 12 is rotated by the stalks in the clockwise sense (arrow D) as the vehicle moves forwardly (arrow B). In the normal operating position of the entire system, only the disk 12 engages the stalks and is rotated thereby. Should, however, the machine deviate to the right with respect to the upstanding-stalks line G, the spokes of disk 11 will also engage these stalks and this disk will be rotated. As will become apparent hereinafter, the joint rotation of the disks 11 and 12 will generate an earlier signal to operate the piston 7 and induce a corrective movement of the steerable wheels 4a. Should, however, the vehicle deviate to the left, the disk 12 will disengage from the stalks and cease rotation, thereby inducing a corrective movement of the wheels 4a in the opposite sense. The disks 11 and 12 have overlapping peripheries (FIG. 7) and are vertically staggered (FIG. 6) so as to be incapable of interfering with one another. Furthermore, the disks 11 and 12 are laterally and longitudinally staggered so that only the innermost disk 12 will engage the stack during proper cutting of a swath. Hence, the vehicle is always directed in an optimal manner to cut the entire swath without leaving any upright stalks at the left-hand side of the machine.

The sensing head 1 is provided with signal-generator means adapted to produce a control signal of electric, pneumatic, hydraulic or mechanical type to operate the steering piston 7c and its cylinder 7. The three-point control operated by this signal and described in greater detail in connection with FIG. 8 or FIG. 9, effectively regulates the distance of the sensing head 1 from the row G of upright stalks serving as the guideline. The use of electrical signals in the form of a pulse train has the advantage that the output of the sensing head 1 is easily transmitted to the control system and can be generated by centrifugal force switches, inductive rate meters, tachometers or the like. Preferably, each sensing wheel 11, 12 is provided with a follower, described in greater detail hereinafter, which responds to the changeover of the star wheel from a stationary condition to rotary movement and vice versa to control an electrical switch opening or closing an electrical circuit adapted to operate a magnetic valve for controlling the steering cylinder 7 or a hydraulic power-steering arrangement for modifying the direction of travel of the field harvester.

Figure 2:
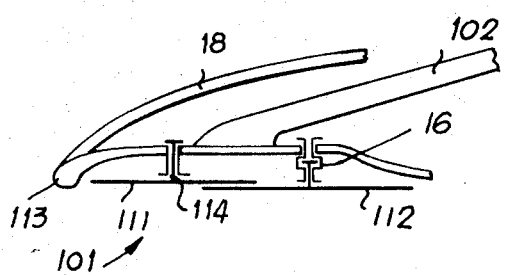
FIG. 2 is an elevational view of the sensing arrangement of FIG. 1 from the side.

In FIGS. 1 and 2, I have shown a head 101 which can be used in place of the head 1 of FIGS. 6 and 7 or interchangeably therewith. In FIG. 1, it is apparent that the upper shield 113 is mounted upon an outrigger arm 102 (analogous to the arm 2 previously described) and carries at the shafts 114 and 115, the star wheels 111 and 112. The star wheels 111 and 112 are here shown to have disk-shaped bodies 111a, 112a, from which rod-like radial spokes 111b and 12b extend in angularly equispaced relationship beyond the inner periphery shield 113 and a stalk deflecting batten 18. The star wheels 111 and 112 are vertically staggered (FIG. 2) such that star wheel 111 is located above the plane of the star wheel 112, and peripherally overlap (see FIG. 2) so that their axes are more closely spaced than the sum of the radii of the two star wheels. The star wheels are also laterally offset.

The large-diameter rearmost disk 112 has its shaft 115 suspended by a hanger 16 in a groove 17 of the shield 113 and is shiftable along this groove (arrow E) whereby the distance X by which the rearward disk 112 projects beyond the forward disk 111 is adjustable and the sensitivity of the head 101 to deviation from its normal position (wherein only the rear star wheel 112 engages the upward stalks) can be modified. Shield 113 is "streamlined" and, as can be seen from FIG. 1, is wedge-shaped so that its inner surface tapers outwardly and forwardly, the batten 18 deflecting the stalks inwardly and preventing the breakage and catching of the stalks. The head described in connection with FIGS. 1 and 2 has also been found to be suitable for engagement with overturned stalks.

Figure 3:
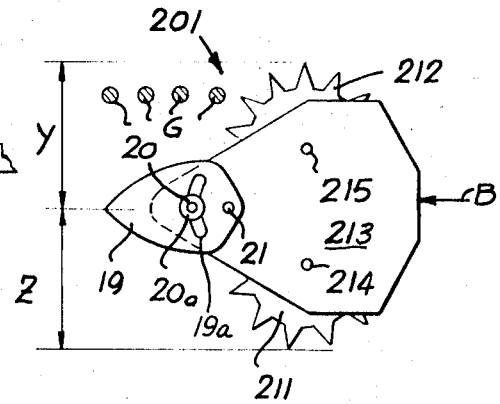
FIG. 3 is a view similar to FIG. 1 of a modified sensing element wherein the formations projecting laterally from the sensing disk are sprocket-like teeth.

In FIG. 3, I have shown a sensing head 201 which is substantially symmetrical with respect to its longitudinal axis.

The star wheels 211 and 212 are here of identical diameter and are rotatable about shafts 214 and 215 carried by a wedge-shaped shield 213, the axes of the shafts 214 and 215 lying in a plane perpendicular to the longitudinal axis of the head. The shield configuration is that of a double wedge seen from above with the star wheel 211 projecting beyond the left-hand edge and the star wheel 212 projecting beyond the right-hand edge of the shield in the direction of travel of the vehicle represented at B. The symmetrical configuration of the head permits it to be used effectively for either right- or left-hand rows of stalks serving as the guidelines.

Both disks 211 and 212 are rotated by the stalks when the rows are separated by a guide tips 19 tapered end of the shield 213. The tip 19 is provided with a locking nut 20 whose bolt 20a is guided in an arcuate groove 19a centered on the pivot 21 of the tip 19. When the nut 20 is released, the tip 19 of the shield 213 can be swung about the axis 21 to adjust the spacing Y or Z and thus the sensitivity of the head 201 to deviations from the normal direction. The head 201, of course, operates in the same manner as the heads previously described. Thus, if the vehicle is traveling in the direction of arrow B and the stalk line is as represented at G, the stalks will engage the star wheel 212 to rotate the latter in the clockwise sense. No stalks engage the star wheel 211 so that this wheel is not rotated. Upon deviation of the vehicle to the right (viewed in the direction of travel), the tip 19 will eventually deflect the stalks G at least partly onto the left-hand star wheel 211 so that both sets of wheels are rotated and a corrective signal is generated. With deviation of the vehicle to the left (seen in the direction of travel), star wheel 212 is withdrawn from the stalk line and ceases its rotation. Here again, a corrective signal is directed to the steering system.

Figure 4:
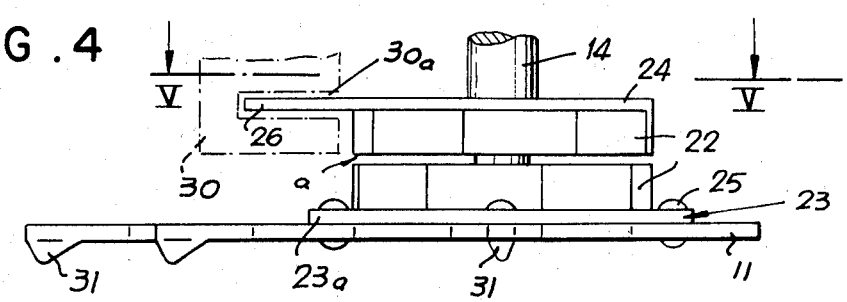
FIG. 4 is a side-elevational view, partly in diagrammatic form, illustrating the rotation-detecting means of a system used in conjunction with that of FIG. 1.

In FIGS. 4 and 5, I have shown somewhat diagrammatically a signal-generator arrangement which can be used for the heads of FIGS. 6 and 7 as well as of FIGS. 1 and 3. Consequently, it should be noted that the senser disks described herein or the star wheels may each be provided with a signal-generating system of the types shown in FIGS. 4 and 5 for the star wheel 11.

The star wheel 11 is coaxial and juxtaposed with a follower arrangement consisting of a pair of rings 23 and 24 each of which has a plurality (eight in number) of angularly offset generally segmental magnet bodies 22. The rings are closely spaced by a distance $a$ (FIG. 4). The ring 23 is here shown to have a circumferential flange 23a and to be secured to the star wheel 11 by rivets 25 for rotation with the star-wheel body by the stalks in the clockwise sense represented by the arrow D when the spokes 11a of the star wheel encounter the stalks G with their leading edges 11b. The other ring 24, carrying the upper crown of magnetic segments 22, is rotatably mounted on the shaft 14 and is provided with a lug 26 engaged by a tension spring 27 anchored at 27a to the shield 13 (not shown in FIGS. 4 and 5). The magnetic segments 22 of the rings 23 and 24 are so arranged that they form alternately north and south magnetic poles. The angular stroke of the ring 24 is limited by a pair of stops 28 and 29, represented in phantom lines in FIG. 5 but depending from the overlying shield 13.

When the star wheel 11 is rotated in the clockwise sense upon its engagement with the stalks G during forward movement of the vehicle (arrow B), the magnetic field of the lower crown of magnets 22 attracts the upper magnetic crown and exerts a torque on the latter in the same sense against the spring 27. The lug or vane 26 of the upper ring 24 is thus swung into the gap 30a in a yoke 30 of a magnetometer which develops an electric output as a result of the change of permeability of the space now occupied by the vane 26. When the star wheel 11 fails to encounter any stalks G, the rotation ceases and no further torque is exerted upon the ring 24. Spring 27 draws the ring 24 in the counterclockwise sense (FIG. 5) and retracts the vane 26 from the gap 30a. Consequently, the signal-generating function is totally frictionless and without mechanical transmission and cannot be affected adversely by wear, contaminants and the like. As can be seen from FIG. 4, the ends of the spokes 11a are provided with downwardly projecting fingers 31 engageable with overturned crop or with crop in a previously cut swath.

It will be understood that the signal-generator system need not be the contactless system of FIGS. 4 and 5 but may have a wiper engageable with a stationary contact and carried by a lug 26 or formed from this lug. In this case, the contact will be positioned close to the stop 29 and will be engaged by the wiper when the ring 24 is rotated by torque developed between the two crown or magnetic segments.

Referring again to FIGS. 6 and 7, it will be apparent that the outrigger arm 2 is provided with a scissor or toggle linkage 3 for movement in the vertical direction. This linkage comprises a pair of bars 32 and 33 which are articulated at 34. A plate 35 mounted upon the field harvester forms a pair of pivots 36 and 37, one above the other, for the nonarticulated ends of the arms 32 and 33. The bearing of pivot 37 of arm 33 is vertically shiftable in a groove 38. The outrigger arm 2 is also swingably mounted at pivot 37 and is formed with a bifurcated end 2d receiving the arm 33 and having a saddle 39 engaging the bar 33 from beneath to limit the counterclockwise rotation of the outrigger arm 2 about the pivot 37. Since the saddle 39 is upwardly open, however, a clockwise rotation of the outrigger arm is possible to raise the sensing head 1.

Between the sensing head 1 (shown on the left in FIGS. 6 and 7) and the pivot 37 of the outrigger arm 2, the arm is engaged by the piston rod 40 of a piston 40a which is shiftable within a cylinder 41. The piston rod 40 is pivotally connected to the arm at 40b while the cylinder 41 is pivotally connected at 41a to a lug 41b of the aforementioned plate 35. The upper end 38a of the groove 38 is closed to form a stop for the journal block 37a carrying the bearings for pivot 37. When the piston-and-cylinder arrangement 40, 41 is extended, the outrigger arm 2 and the scissor or toggle linkage 32, 33 are lifted until the pivot bearing 37a engages the stop 38a of the groove 38. Further extension of the positioning cylinder 41 swings the arm 2 in the clockwise sense into a raised retracted position (not shown). Contraction of the piston-and-cylinder arrangement lowers the outrigger arm 2 into a forwardly extended position and then finally sets the head 1 at its desired height. Instead of the scissor or toggle linkage 3, it is also possible to make use of a parallelogrammatic linkage (see FIGS. 13 and 14) for maintaining the arm 2 and its head 1 parallel to itself and to the horizontal or ground plane as it is raised or lowered. A parallelogrammatic linkage is, however, somewhat more expensive and requires considerably more room.

The plate 35 is pivotally mounted at 42 on the housing portion 4f of the harvester body and thus is swingable about an upright or vertical axis on the forward end of the harvester. The piston rod 44 of a double-acting hydraulic servocylinder 45 is pivotally connected to an arm 43 of the plate at an articulation point 44a. Cylinder 45 is pivotally connected to a lug 45a at 45b. The cylinder 45 is thus able to swing the outrigger arm 2 in a horizontal plane about the pivot 42 as represented by the arrow F to position the head 1 in any desired lateral location with respect to the stalk line G.

The piston rod 6 of the steering-power cylinder 7 extends through a double-acting cylinder 46 (FIG. 7) whose piston 47 is rigid with the rod and is entrained with the piston 7c and the wheels 4a in a feedback connection to cylinder 45, as will be described in greater detail in connection with FIG. 8.

From FIG. 8 it can be seen that the cylinder 46 has its chamber behind its piston 47 connected via a line 46a wtih the valve 55 (line 51) and a line 49 feeding the chamber of cylinder 45 behind the piston 44. A further line 48 connects the working chamber ahead of the piston 47 of cylinder 46 with valve 55. As a result, the positioning piston 44 is shifted synchronously with the steering action in the sense of the steering direction in a regenerative feedback path, thereby swinging the outrigger arm 2 in a resultant direction of corrective steering. In other words, the cylinder 46 acts as a servotransmitter to reposition the arm 2 via the slave cylinder 45 upon initiation of a steering correction. Hence, the sensing head 1 assumes a correct position ahead of the machine, and degeneration of control does not occur.

It will be understood that it is also possible, instead of positioning the head 1 on a swingable outrigger arm, to couple the head substantially rigidly with the mowing assembly, e.g. in combination with or on the stalk divider (see FIG. 16), and to render the entire mowing assembly including the sickle bar, its stalk dividers and blades, horizontally shiftable on the front end of the harvesting machine; it is then possible to shift the entire assembly with the servocylinder 45 (or its functional equivalent) via a feedback path of the type described. In this case, the mowing assembly and sensing head will be displaced into its corrected position prior to the correction in the course of the machine (which is effected with a slight lag). This feedback arrangement, while more sophisticated than the feedback connection to an outrigger arm, requires a larger force at the servocontrol cylinders 44, 45 and complex means allowing movement of the entire mower assembly.

The lines 50 and 51 are connected further via check valves 52 and 53 to a hydraulic (leakage) accumulator adapted to absorb hydraulic surges. Furthermore, the lines 48 and 49 are connected via lines 50 and 51 to a control or distributing valve 55 as previously indicated. The hydraulic pump of the harvesting machine is represented at 56 and draws fluid from a reservoir 57 while a check valve 58 returns excessive fluid to this reservoir in a pressure-relief bypass. An adjustable throttle 59 is provided in a return line 59a from the valve 55 to the reservoir 57. A further check valve 60 can connect the hydraulic accumulator 54 to the remainder of the hydraulic system of the harvesting machine.

In parallel with the cylinders 45 and 46, I provide a further double-acting hydraulic cylinder 61 whose lines 62 and 63 at the left- and right-hand sides of the piston 64, respectively, are tied to the lines 50 and 51, the lines 48 and 49, and the lines 46b and 46a respectively. The piston 64 of this cylinder is connected by a rigid rod 67 to a force-amplifying piston 65 of a double-acting cylinder 66. Hydraulic pressurization of cylinder 66 causes the piston 64 to increase and decrease pressure in the lines 48, 49 and thereby to operate the servocylinder 45 and its piston 44. By actuation of the cylinder 66 by any conventional system such as a distributing valve 55, the operator of the harvesting machine is able to control the position of the sensing head 1 and/or the mower assembly independently of the automatic servo-response of the feedback network. Thus, oversteering may be prevented by the operator or displacement of the mower assembly and/or the sensing head 1 may be effected in a convenient manner.

The valve 55 is shown to have an intermediate position 55a, corresponding to the absence of correction and a pair of extreme positions 55b and 55c effective when the valve body is drawn to the right and to the left, respectively, under the influence of the signal generators represented at H and J, respectively. These signal generators correspond to the device 30 associated with each of the disks 11 and 12 and feed a comparator K whose output controls the valve body. In position 55b of the valve 55, hydraulic fluid is fed under pressure to line 51 while line 50 is connected by the throttle 59 to the reservoir 57. Fluid under pressure is delivered behind the piston of cylinder 7 or solely to the chamber 46, thereby urging the rod 5 to the right to the shift the lever 4b in the clockwise sense with the concurrent steering action at the wheels 4a. The vehicle then commences a turn somewhat to the left, as viewed in the direction of travel of the vehicle in FIG. 7. The displacement of the valve 55 to the right to render position 55b effective results when both signal generators H and J are effective. This course correction withdraws the disk 11 from engagement with the stalks G whereupon the signal generator H is rendered ineffective and the valve is returned to its intermediate position. Should, however, the sensing disk 12 withdraw from contact with the stalk line G, both signal generators H and J fail to provide an input to the comparator K which shifts the valve member to the left to render position 55c effective. In this position, the fluid is delivered under pressure by the pump 56 to line 50 and thence to cylinders 7 and 46 to urge the rod 6 to the left and rotate the lever 4b in the counterclockwise sense. The result is a movement of the vehicle M to the right as viewed in the direction of travel in FIG. 7.

Preferably, the feedback is responsive to the average angle of attack of the corrected steering motion and is free from the perturbations of movement (resulting from irregular ground surfaces, etc.) of the sensing head 1 and the mower bar 8 generated by the normal movement of the machine along the swath to be cut. A hydraulic circuit arrangement for eliminating the effects of such minor ferturbations is represented in FIG. 9 which shows a stabilizer 68 adapted to control the feedback in accordance with the average or mean angle of attack of the steering linkage as corrected by the head 1. The stabilizer 68 of FIG. 9 includes a damping cylinder 69 filled with a hydraulic fluid and subdivided by an axially shiftable piston 70 into two compartments 71 and 72. The compartments 71 and 72 are hydraulically interconnected by a duct 73 having a variable throttle 74 whose control member 74a regulates the response time and is operated by a centrifugal governor 75 in dependence upon the speed of the driving wheels of the vehicle and/or the temperature. To this end, the governor 75 has a shaft 75a connected to the driving wheels of the vehicle and rotated at an angular velocity proportional to the vehicle speed. The centrifugally outwardly displaceable masses 75b control a plate 75c which is axially shiftable as the weights swing outwardly (arrow L) to control the position of a lever 75d which is biased in the counterclockwise sense about a fulcrum 75e by a spring 75f and is coupled with the throttle member 74a previously described.

A pair of springs 76, 77 of the helical compression type are seated against the separating piston 70 and bear in opposite directions against plates 78 and 79 which are rigid with a control rod 80 connected with the steering linkage. This connection is effected by an arm 81 which is rigid with the piston rod 6 of the linkage and is tied to the rod 80 at the pivot 80a. In other words, the rod 80 is shiftable synchronously with the correction movements of the rod 6.

A movement of rod 80 to the left will compress spring 77 and decompress spring 76, thereby providing an unbalanced force on piston 70 to the left. Conversely, movement of rod 80 to the right will compress spring 76 and decompress spring 77 to provide an unbalanced force tending to urge the piston 70 to the right. With either unbalanced force, the piston 70 is urged in the corresponding direction and tends to displace the fluid within the compartments 71 and 72 past the throttle 74 in the same direction via the bypass duct 73. Since minor perturbations in the movement of the rod 6 will be taken up primarily by the springs 76 and 77, a movement of the piston 70 will correspond only to the net, integrated or average corrective movement corresponding to the average angle of attack of the steering linkage mentioned earlier.

The hydraulic fluid for the compartments 71 and 72 is supplied by the pump 56 from the reservoir 57 via a check valve 82a and an accumulator 72'. However, another fluid source may equally be used or the fluid can be a gas. Since the viscosity of the hydraulic fluid used in the system of the present invention is temperature-dependent, I have also found it to be advantageous to control the throttle 74 cross-section, aside from the speed control, with the aid of a thermostatic member capable of sensing the fluid temperature.

The separating piston 70 is connected by a yoke 82 externally of the cylinder 69, with the control pin 83 of a hydraulic control member 84 for the piston 64 of the feedback cylinder 61. The control member 84 is a valve structure which comprises a cylinder 85 having an axially shiftable piston 86 with a central axial bore 87 slidably receiving the left-hand end of the control pin or plunger 83. The latter is formed at this end with a head 88, set off by an annular groove 91 from the body of the pin 83. The head 88 is designed to block a passage 89 running from a chamber 90 in cylinder 85 at the right-hand side of a piston 86 which is axially shiftable in this cylinder and is provided with the passage 89 and the bore 87. When the pin 83 is in a right-hand position with respect to the piston 86, communication is established between the left-hand chamber 94 of cylinder 85, bore 87, passage 89 and the right-hand chamber 90 to connect the return line 96 to the chamber 90 and thereby allow a spring 95 to shift the piston 86 to the right.

Upon movement of the control pin 83 to the left, passage 89 is connected via an annular groove 91 to a radial bore 92 in the piston 86 and thence to a chamber 92a between the piston 86 and the wall of cylinder 85. This chamber is permanently connected via a line 93 with the pressure side of pump 56. In this position of the pin 83, chamber 90 is subjected to the pump pressure and the piston 86 is biased to the left against the spring 95. The axial shifting of piston 86, in each direction, terminates as soon as the passage 89 of the piston 86 is blocked by the head 88 of the pin 83. In other words, the piston 86 is a hydraulic-force multiplier which follows the movement of the pin 83 and reestablishes its rest position to coincide with the rest position of the control pin 83 which, in turn, responds to the position of the piston 70.

Since the piston 86 is coupled with the piston 64 of cylinder 61, the piston 64 is shifted into a corresponding position to operate the feedback-arrangement with the stabilization previously mentioned.

The aforedescribed structure has numerous advantages over earlier sensing and control systems for self-propelled and tractor displaced field harvesters, thrashers and the like. A prime advantage is that the disks 11 and 12 readily discern the guideline of the stalks along the swath whether the stalks are overturned or upright. Also, the reduced force necessary to drive the star wheels 11 and 12 allows the system to be used even with relatively weak crop stands. Further, the provisions of the stabilizer 68 to eliminate the effect of perturbations arising from the motion of the front end of the harvesting machine allows the system to be used for the automatic control of harvesting machines even on irregular ground surfaces.

In the systems of FIGS. 10–19, the sensing device is mounted so as to be swingable in a horizontal plane and/or is provided with shiftable links carrying the outer star wheel and enabling the latter to be swung inwardly by any externally applied pressure excess or by the operator.

Thus, in FIGS. 10 and 11, the sensing head 301 is mounted at the end of a support bar 302 ahead of the left-hand stalk divider 309 of a sickle bar 308. The sickle bar 308 is mounted in a support frame from which only an end portion 308a can be seen, the support frame being mounted upon the body of the field harvester which has not been shown. A suitable support-frame arrangement may be that of FIG. 16.

The sensing head 301 has a shield-shaped plate 313 of streamlined configuration with a stalk-guiding tip 319, the plate 313 being mounted on the rod 302. On the plate 313, I provide a link 313a in the form of a lever which is hinged at 313b to the plate. The bar 302 has an end portion 302a turned away from the plate 313 rotatably received in sleeve 302b of a rotating head 302c and rotatable about an axis parallel to the bar. The rotatable head 302c is, in turn, rotatable about a horizontal axis, perpendicular to the axis of the bar 302a, in a support 309a of the stalk divider 309.

Figure 12:
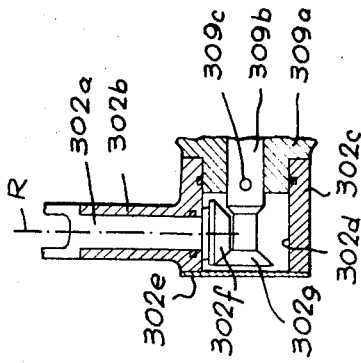
FIG. 12 is a cross-sectional view taken along the line XII—XII of FIG. 11.

As can be seen from FIG. 12, the rotatable head 302c is provided with a transverse bore 302d which is covered by a disk 302e. In this bore, a bevel gear 302f is mounted on the reduced-diameter end 302a of the bar 302 and meshes with a further bevel gear 302g rotatable about the horizontal axis perpendicular to the axis of the bar 302, 302a. The bevel gear 302g is carried by a shaft 309b mounted on the support 309a by a transverse pin 309c and projecting therefrom into the bore 302d. A lug 302h on the sleeve 302b is coupled with a piston rod 302j of a hydraulic positioning cylinder 302k (operated by the circuit of FIG. 17) which is pivoted on a lug 302m so as to be swingable in a plane (parallel to the plane of the paper in FIG. 11) and about the axis N in FIG. 10. In the cylinder 302k, the rod 302j is provided with a piston 302n which is urged by a spring 302p in the direction of arrow P. The other side of the piston is supplied with hydraulic fluid which is effective to displace the rod 302j in the opposite direction. The arrangement is so designed that, upon hydraulic depressurization, the piston rod 302j is drawn inwardly under the force of spring 302p and the sensing assembly is swung in the direction of arrow Q (FIG. 11) along the path represented in broken lines.

The co-operating bevel gears 302f and 302g effect a rotation of the bar 302 and the head 301 about the axis R through about 90° for a swing of the bar through an angle of, say, 130° to bring the outrigger arm into its dot-dash position shown in FIG. 11. It will be understood that, in place of bevel gears 302f and 302g, the bar 302 can be provided with an eccentric pin which is guided in a camming groove to effect the rotation of the head during the swing. The arrangement has the advantage that the rotation can be effected in only a limited region of the total swing of the outrigger arm but brings large forces to bear upon to mutually engaging camming surfaces. In the retracted condition, the sensing head 301 and the outrigger arm 302 lie within the outlines of a wedge-shaped housing 309d in a vertical position and forming part of the stalk divider 309. The housing 309d serves to prevent distortion to the outrigger arm and head and to keep them free from contaminants. In the extended position, the bar 302 is brought to bear upon an adjustable stop 309e on the stalk divider 309 (FIG. 11).

As can be seen from FIG. 11, the sensing head 301 is suspended by the arm 302, in its extended condition, close to the ground surface S, preferably just above the level of the stubble cut by the sickle bar 308, and engages the stalk line running on the right of the sensing head in the direction of travel represented by the arrow B as previously described.

The head 301 is provided with a pair of star wheels or disks 311 and 312 which may have the configurations illustrated in FIGS. 1, 3, 5 and 7 but are shown in simplified form in FIGS. 10 and 11. The star wheels 311 and 312 are rotatable on their shafts 314 and 315 and may be provided with signal-generating arrangements as previously described or with the modified control arrangements shown, for example, in FIGS. 18 and 19.

The star wheel 311 is disposed between the plate 313 and a skid 313c such that its toothed or spoked periphery projects beyond the outline of the housing formed by plate 313 and skid 313c toward the stalk line G for engagement with the stalks thereof when the harvesting machine deviates toward the right (as seen in the direction of travel B).

The star wheel 312 is here located at the same height and in the same horizontal plane as star wheel 311 but is mounted on a shaft 315 at the free end of a link or lever 313a which widens from its pivot 313b into a tail at its trailing end. Here again, the periphery of the star wheel projects in the direction of the stalk line. The lever 313a is formed with a skid-like construction 313d, extending downwardly from the level (FIG. 11) such that the star wheel 312 lies in a slot or channel of this lever. The formation 313d thus protects the bearing surfaces of shaft 315 against contamination and engagement with rocks or other irregularities of the ground.

The plate 313 and the lever 313a are so shaped as to deflect the stalks to the right along the outer peripheries of these portions and guide the stalks into the toothed peripheries of the star wheels 311 and 312. At its trailing side, the lever 313a is provided with a stripper 313e which intercepts stalks entrained by the wheel 312 to clear the latter. On a lever arm 313a' of link lever 313a, a tension spring 313f is anchored and draws the lever in the counterclockwise sense about its pivot 313b. The other end of the spring is anchored to a lug 302r of the bar 302. An adjusting screw 302s forms a stop for the arm 313a' and thus the lever 313a.

Advance of the screw in the direction of movement of the vehicle (arrow B) retracts the star wheel 312 inwardly against the arm 302 while the reverse movement of the adjusting screw allows the star wheel 312 to swing further inwardly into the path of the stalks. In addition, a bowden cable 302t is anchored to the lever 313a and has its sheath 302u running rearwardly from the head to a location convenient to the operator of the vehicle. A handle 302v allows the operator to grip the bowden cable and to draw the lever 313a in the clockwise sense to retract the star wheel 312 against the force of spring 313f (away from the stalk line). In the extreme retracted position, the common tangent T to the toothed peripheries of the star wheels 311 and 312 is located parallel to the direction of travel B of the vehicle. It will be understood that the link lever 313a can also be cammed inwardly by any resistant formation encountered by the star wheels to prevent damage to the head.

The entire stalk divider 309 is, in this embodiment, swingable about a vertical shaft or pivot 342 in the horizontal plane relative to the mower assembly on which it is mounted. To effect such swinging movement, I provide a servocylinder, shown in simplified form in cross section at 345. The axially shiftable piston 345a of this cylinder is connected by a rod 344 to the stalk divider 309 at a pivot 344a. The cylinder 345 is affixed by a flange 308b to the mower assembly 308 (FIG. 11).

The servocylinder 345 is connected by hydraulic lines 348 and 349 to the hydraulic system of the field harvester, e.g. a system of the type shown in FIG. 8. Line 349 is flexible to accommodate the longitudinal movement of the control plunger 345b as will be apparent hereinafter and line 348 can be considered a return line to a reservoir while line 349 is a supply line from a hydraulic pump. The line 349 opens into a passage 345c in the rod 345b which is urged out of the piston 345a by a compression spring 345d. From the rod 345b, the hydraulic fluid under pressure is delivered to the axial bore 345e of the servo-piston 345a between the heads 345f and 345g of the plunger 345b. Outlet 348, in turn, communicates with a pair of passages 345h flanking the heads 345f and 345g and located on opposite sides of a pair of passages 345i and 345j, respectively. In this respect, the servovalve 345 is constituted similarly to the valve 84 of FIG. 9.

The passage 345i, shown to be blocked by the head 345f, communicates with the chamber 345k behind the piston 345a, while the passage 345j, blocked by head 345g, communicates with the compartment 345m ahead of this piston. Consequently, when the plunger 345b is shifted forwardly (arrow B in FIG. 10), the head 345f unblocks passage 345i to permit communication of fluid under pressure from inlet 345c, through passage 345i to chamber 345k, while return of fluid from chamber 345m proceeds via passage 345j and passage 345h to the outlet 348; the piston 345a is thereby moved in the direction of arrow B, i.e. in a corresponding manner, until passages 345i and 345j are again blocked.

Movement of the plunger 345b in the opposite direction relative to the piston 345a will result in communication between the high pressure line 349 and passage 345j via the channel 345c to pressurize compartment 345m; concurrently, chamber 345k is connected to the reservoir by line 348. The result is a hydraulically induced movement of the piston 345a to follow the movement of the plunger 345b. The plunger 345b is connected by a bowden cable 345p to a manually operated actuating lever the bowden cable passing about an idler pulley 345r.

As the piston 345a moves forwardly (arrow B), the stalk divider 309 is swung in the clockwise sense to bring the star wheels 311 and 312 closer to the stand of crop while a movement of the piston 345a in the opposite direction (i.e. rearwardly) swings the stalk divider 309 in the counterclockwise sense about the pivot 342. A link 342a connects this control stalk divider with the stalk divider in the corresponding sensing head on the right-hand side of the mower assembly. The cylinder 345 is controlled as described with the cylinder 45 in connection with FIG. 8.

In FIGS. 13 and 14, I show another system for controlling the position of the sensing head 401 of a mower arrangement. The vehicle body is here represented at 404 and has a front axle 405 for the front wheels 404a which are steerable. The right front wheel is shown in FIG. 13 and is mounted upon the crank lever 444b which has its fulcrum 444c upon the front-wheel axle 405 and is connected with the working cylinder 407 for the steering operation. The cylinder 407 is operated by a hydraulic system as described in connection with FIGS. 8 and 9. A piston rod 406 connects the piston 407c of cylinder 407 with the lever 444b at a pivot 444h and also serves as a tie rod equivalent to the rod 4d of FIG. 7 to connect the steering levers 444b on opposite sides of the machine together.

Behind the front-wheels 404a the sickle bar 408 is cantilevered at the right-hand side of the machine and thus can be considered to cut a swath alongside the machine path. The row of stalks guiding the vehicle is here located along the right-hand side of the latter and is represented at G. The sickle bar 408 has a stalk divider 410 at each end of the bar and is held on the side 404g of the tractor by a pair of bars 404j.

The sensing head 401 is constructed along the principles previously set forth and is located forwardly on the front wheel 404a on an angular assembly generally represented at 402 and serving to raise and lower the head 401 as will be apparent hereinafter. The head 401 is mounted on an outwardly bent arm 402a which supports a skid plate 413 forming a housing for the star wheels. The parallelogrammatic linkage for raising the outrigger arm assembly 402 is represented at 403 (FIG. 14) and comprises the bar 402a which has a portion 402b extending parallel to the head and to a further link 403a. The bars 403a and 402b are interconnected by mutually parallel links 403b and 403c which are of equal length and define a parallelogrammatic linkage which raises and lowers the head 401 parallel to itself.

On the upper surface of the skid-shaped support plate 413, I have provided the star wheel 411 whose shaft 414 is represented in broken lines in FIG. 13 and which projects outwardly of the outline of the housing of the head. The latter is provided with a deflecting batten 418 beyond which the periphery of the star wheel 411 extends for engagement with the stalks. Offset outwardly of the star wheel 411, I provide the star wheel 412 whose shaft 415 rotatably supports the star wheel on a link 413a which is guided by a rod 413b and leaf-spring bundle 413f for movement on the base plate 413 approximately perpendicularly to the stalk line G. The movement of the link 413a is limited by a stop 402s which may be adjustable as described in connection with the stop 302s of FIG. 10. The end portion of the link 413a is so shaped that at least one edge 413c of the link 413a extends approximately parallel to the direction of movement of the vehicle (arrow B), the toothed periphery of the star wheel 412 projecting beyond this edge. The edge 413c forms a striker adapted to strip any stalks or other crop material from the star wheels. The plate 413 is provided with a tip 419 from which the batten 418 extends rearwardly.

The upper arm 403a of the parallelogrammatic linkage 403 is extended at 403a' into a bifurcation which is articulated at 403a'' to a horn-shaped member 403d. A stop 403d' holds the assembly 403, 403d in the illustrated extreme position when the cylinder 441 is hydraulically depressurized. The cylinder 441 is pivotally connected at 441a to the lower end of the support member 403d and receives a piston whose rod 440 is articulated at 440b to the parallelogrammatic linkage 403 at the junction between arms 402b and 403c. Thus, extension of the cylinder arrangement will lift the head 401 from the ground while retraction will lower the head closer to the ground, the head remaining parallel thereto.

At is upper end, the support member 403d forms a bracket for a pawl 403e which is pivotally connected to this member at 403f and is provided with a head 403g for locking the extension 403a' at its protuberance 403h in place to prevent vertical movement of the head in the vertical plane. The support 403d is also connected with a rail 403j which is swingable on an arm of a bell-crank lever 403k about a horizontal fulcrum 403m on bar 403j. The bell-crank lever 403k is, in turn, swingable in a horizontal plane on the front axle 405 of the machine and engages at its other arm the piston rod 444 of a positioning or servocylinder 445. The latter is a double-acting cylinder which is pivoted at 445b to the housing 404 and is operated by the hydraulic system of the machine as described in connection with FIGS. 8 and 9. The rail 403j is so connected with the positioning rod 406 of the steering cylinder 407 that the sensing head 401 is synchronously, simultaneously and in the same sense swung in step with the steering motion of the wheels. To this end, the rail 403j is received in a slidable sleeve 403n which is connected by a pair of links 403p with nuts 403q on a threaded spindle 403r. The latter is mounted on the positioning bar 444 and is rotatable by means of a lever 444a. In this arrangement, rotation of the spindle 403r shifts the sleeves to change the effective length of the lever between the pivot point 403m and the sleeve 403n. To compensate for the weight of the head 401, a counterweight 401' is provided at the end of the rail 403j remote from the head.

In addition, the rail 403j is held by a guide member 403s. With the aid of the cylinder 445, it is possible to swing the sensing head 401 independently of the steering linkage to compensate for irregularities in the travel of the vehicle, geometric deviations in the stand of the crop as detected by the right- and left-hand sensing means, etc.

In the drawing (FIGS. 14 and 15) the sensing head 401 is shown closely spaced above the stubble. By actuating the cylinder 445, the distance between the ground surface S and the head 401 can be adjusted while the horizontal position of the disks 411 and 412 is maintained. Only when the lever 403e is released is the linkage 403 rendered ineffective and the entire assembly permitted to swing in the counterclockwise sense out of operating position. The spring 403e' biases the pawl 403e into its locking position.

Figure 15:
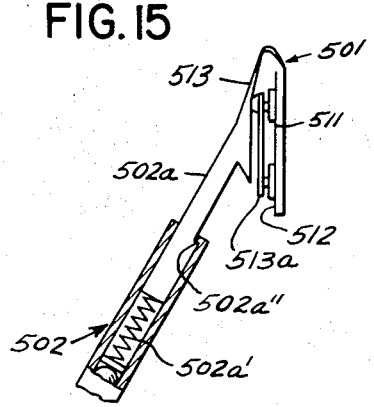
FIG. 15 is a side-elevational view of a sensing system for this mower.

As can be seen from FIG. 15, the head 501 is preferably elastically suspended from its outrigger arm 502 in the embodiments of FIGS. 13 and 14 or in the embodiments of FIGS. 1–7. To this end, the outrigger arm 502 is provided with a telescoping extremity in which the shank 502a is received. A compression spring 502a', received in the hollow tubular arm 502, urges the shank 502a in the forward direction. The head 501 is provided with a swingable link 513a carrying the outer star wheel 512 and a housing 513 forming a journal for the inner star wheel 511. A shoulder 502a'' on the shank 502a engages an inwardly turned flange on the tubular outrigger arm 502 to prevent withdrawal of the shank 502a from the arm 502. In place of a compression spring 502a', it is also possible to make use of a tension spring which partly compensates for the weight of the head 501 and allows the latter to yield upwardly. It is also convenient to provide a resilient suspension for each of the star wheels 11, 12; 111, 112; 211, 212; 311, 312; 411, 412; or 511, 512. In this case, only a small mass must be displaced to deflect the star wheels. It should also be noted that the embodiment shown in FIG. 15, the star wheels 511 and 512 are disposed in a common horizontal plane, thereby allowing the total height of the head to be minimum. However, the staggered arrangement described in connection with FIGS. 1–7 may also be used.

In FIG. 16, I have shown another embodiment of the present invention wherein the mower assembly is represented generally at 608 and comprises a pair of stalk dividers 609 and 609' to the left-hand and right-hand sides of the mower bar, respectively. Each of the stalk dividers 609 and 609' is provided with a respective sensing head 601, 601' with the aforementioned swing link 613a, 613a' and the star wheels 611, 611'; 612, 612', the functions of which have been described earlier. Either of the specific constructions of FIGS. 10 and 11 or of FIGS. 13 and 14 may, of course, be used.

The mower assembly is mounted upon a support frame carried by the front portion 604 of the vehicle. The frame comprises a pair of parallel bars 608a, 608a' which are pivotally joined to the vehicle body 604 at fulcra 608b, 608b', respectively. Remote from the mower 608, the arms 608a, 608a' are joined together by a transverse rod 608c at respective pivots. A second pair of arms 608d, 608d' is swingably guided on the members 608e, 608e' for pivoting movement in the vertical direction. The members of the support frame are so arranged and connected that a movement of the positioning bar 608f as represented by the arrow V will swing the assembly to the left and to the right in a corresponding sense. The link 608f is affixed to the member 608a' at the lug 608f'. The swinging movement of the arms 608a and 608a' maintains the mower parallel to itself as it is moved to the right and to the left. Member 608f is connected in a feedback circuit to the control system as previously described (see especially FIGS. 8 and 9).

In addition, a hydraulic servocylinder 608g is provided between the link 608c of the parallel bars 608a and 608a' and the link 608h connecting the bars 608d and 608d'. A sensing arrangement, represented generally at 608i, detects the position of the ground surface and controls the servocylinder 608g to regulate the height of the mower bar 608 and its sensing head 601, 601' by swinging the assembly upwardly or downwardly about the horizontal axis W. In addition, the sensing heads 601 and 601' can be swing inwardly, e.g. via a cylinder of the type shown at 302k in FIG. 10 and can be received within the stalk divider 609 and 609' as described in connection with FIGS. 10 and 11. The members 613a and 613a' can be spring-biased outwardly as described for the link 313a and may be drawn inwardly by a bowden cable as illustrated at 302s through 302v.

Figure 17:
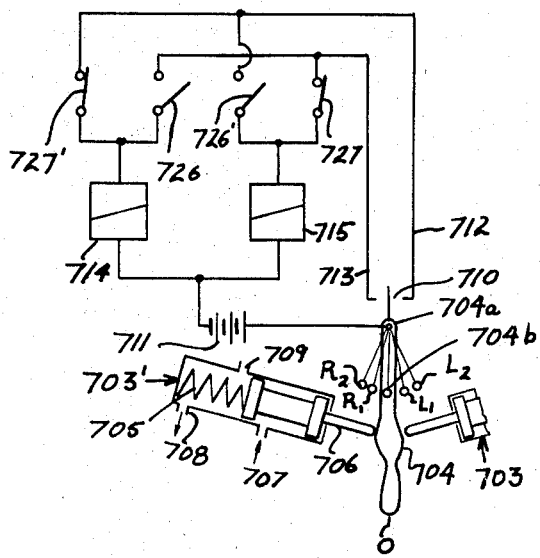
FIG. 17 is a circuit diagram of electrical and hydraulic elements used in the control system of an agricultural machine.

In FIG. 17, I show a control system for the servocylinders 302k on each side of a mower bar of the type shown at 608 in FIG. 16. Each of these cylinders, designed to retract the respective sensing heads upwardly into the upwardly open housing formed by the respective stalk divider, comprises a pair of valves 703 and 703'. These values have a common actuating lever 704 and the valve 703 is illustrated only partly in this figure. Each valve 703, 703' is provided with an axially shiftable valve member 706, bearing upon the control lever 704, which is biased by a compression spring 705 against the control lever.

From a pump, e.g. the pump 56 previously described, hydraulic fluid under pressure is delivered to the valves 703, 703' via the high-pressure line 707 while a return line 708 is connected with the reservoir 57 (see FIG. 8). Line 709 of each valve is connected to the servocylinder 302k, which is of the single-acting type, behind the piston 302n so that fluid delivered to this cylinder acts counter to the spring 302p. As has been noted, one such cylinder is provided for each of the sensing heads 601, 601' and is connected to the respective valve 703, 703'.

In the indicated position of member 704, corresponding to the 0 or "zero" position, the lines 708 and 709 are connected to relieve the cylinders 302k such that their springs 302p drive the pistons 302n more deeply into the cylinders (arrow P in FIG. 10), thereby swinging the head into its retracted position. If the lever 704 is swung about its axis 704a into the position illustrated at $R_1$, the member 704 being indexed in its several positions by the detents represented diagrammatically at 704b, the valve 703' has its member 706 shifted to the left against spring 705 to connect the corresponding lines 707 and 709, thereby allowing hydraulic fluid to pass under pressure into the cylinder 302k associated with the right-hand sensing head 601', to drive the piston 302n (FIG. 10) outwardly and lower this head.

In the position $L_1$ of the lever 704, the sensing head 601 at the left-hand side of the machine, viewed in the direction of travel B in FIG. 16, for example, is extended. In position $R_2$ of the control member 704, a reversing swing 710 is brought into play to connect a direct-current source (shown as a battery 711) with one line (712), while a movement of the control lever 704 into its opposite extreme position $L_2$ connects the battery 711 with the other line 713. The electrical conductors 712 and 713 are associated with circuits for two electromagnets or solenoids which are represented at 714 and 715, respectively. The solenoid 714 operates a hydraulic valve to control fluid flow admitting hydraulic fluid, for example, to the chamber of cylinders 407 behind piston 407c (FIG. 13) to turn the vehicle to the left. In other words, the solenoid 714 controls the steering-power cylinder for left-hand movement of the vehicle. When the solenoid 715 is energized, it correspondingly operates the power cylinder for right-hand steering movement.

As can be seen from FIG. 17, the solenoids 714 and 715 are connected in circuit with a switch 726 which is connected to line 713. This line is also connected to the switch 727 of solenoid 715 whose switch 726' is connected to the line 712 in parallel with the normally closed switch 727' of solenoid 714.

The switches 726, 726' and 727, 727' are actuated in one sense or the other by rotation of the respective star wheels 611, 611' and 612, 612' of the sensing heads 601, 601' (as described in connection with FIG. 16). At each transition from immobility to rotation, the disk 611 closes the switch 726, the disk 612 opens the switch 727, the disk 611' closes the switch 726' and the disk 612' opens the switch 727'. Assume that both disks or star wheels 612 and 612' are rotated by engagement with respective stalk lines but star wheels 611 and 611' are out of engagement with the stalk lines; in this condition, no correction is required. Thus all of the switches 726 and 726' and 727, 727' are open and the solenoids 714 and 715 are ineffective. When, however, both disks 611 and 612 on the left-hand side of the machine are rotated and both disks 611' and 612' at the right-hand side would be disengaged from the stalk line, switch 726 will close, switch 727 will remain open, switch 726' will remain open and switch 727' will close. When lever 704 is then also shifted to readjust the position of the vehicle, the left-hand steering solenoid 714 will be energized to effect a corrective action as previously described. In other words, the lever 704 functions as a selector to render effective one or the other of the sensors in accordance with the stalk line to be followed. In addition, this lever allows cutting in or out the automatic control function as described.

Figure 18:
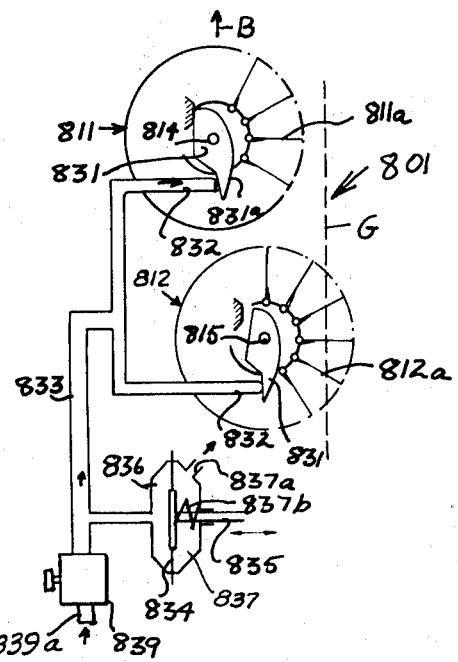
FIG. 18 is a plan view of a control system using pneumatic rotation-detecting means.

In FIG. 18, I have shown a sensing arrangement which can be used for the disks 11, 12; 111, 112; 211, 212; 311, 312; 411, 412; 511, 512; or 611, 612 and which here makes use of disks 811 and 812, respectively. The movement of the sensing head 801 is assumed to be in the direction of arrow B along a stalk line G which is here shown to engage the spokes of 812a of the star wheel 812. In this case, the star wheel 811 remains stationary while the star wheel 812 is rotated. Each star wheel is associated with a follower 831 which is balanced on the respective shaft 814 and 815 so as to be freely swingable thereon and to lie in a position shown for the upper follower 831 in FIG. 18 when the respective star wheel is not rotated. Each of the followers 831 is formed with a finger 831a juxtaposed with a mouth or nozzle 832 for the blocking of air flow therefrom in the extreme clockwise position of the follower. The nozzles 832 are connected in parallel to a pressure line 833 which is supplied with fluid under pressure at an inlet 839a via a control valve 839. Also connected in parallel to line 833 is a pressure-responsive assembly consisting of a pair of chambers 836 and 837, separated by a diaphragm 834 which is responsive to the pressure differential across these chambers. Chamber 837 is vented to the atmosphere at 837a and receives a spring 837b which biases the membrane 834 into its rest position as illustrated. The membrane 834 is affixed to a control rod 835 which may operate the valve 55 shown in FIG. 7 to control the direction of movement of the vehicle.

Under normal conditions, the star wheel 812 is rotated by engagement with the stalks as the vehicle progresses along the swath and magnetically or with light friction entrains the follower 831 in the clockwise sense as well. Nozzle 832 associated with the star wheel 812, is blocked. The nozzle associated with the star wheel 811 remains open to bleed fluid from the pressure line 833, thereby applying an intermediate pressure at chamber 836 to position the rod 835 as shown and maintain the valve 55 in its intermediate position. When a correction is required, e.g. when the head 801 turns into the stand of the crop, both star wheels 811 and 812 are rotated and both nozzles 832 are blocked. A higher pressure now arises in chamber 836 to shift rod 835 to the right and thereby operate valve 55 to effect the corrective action. Should the head 801 move in the opposite diection, both star wheels 811 and 812 will be withdrawn from engagement with the stalk line and cease rotation. In that case, a stronger pressure drop occurs in the line 833 as both nozzles open into the atmosphere and spring 837b biases the membrane 834 and rod 835 to the left to effect a corresponding steering correction and again bring the stalk line into engagement with the star wheel 812. Here again, a feedback arrangement can be provided to adjust the position of the head, and the star wheel 812 can be mounted upon a swinging or slidable carrier as described previously.

Figure 19:
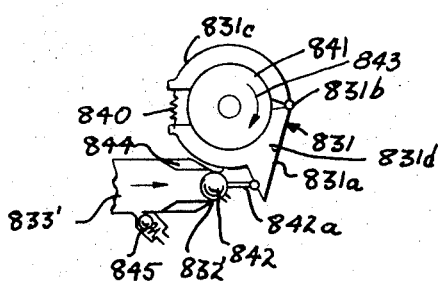
FIG. 19 is a view of a modification of a pneumatic control system.

In FIG. 19, I show a friction coupling between the star wheel, e.g. 811 or 812, and the associated follower 831. In this arrangement, the follower 831 is formed from a pair of articulated friction brakes whose hinge is shown at 831b and which are identified at 831c and 831d. A tension spring 840 draws the friction brakeshoes together against a cylindrical drum 841 connected with the respective star wheel. Spring 840 can be of adjustable tension to control the friction force with which the follower 831 is coupled with the star wheel.

The finger 831a of the follower 831 is here shown to be coupled via a link 842a with a ball valve 842 which is received in the funnel-shaped mouth 832' of the pressure line 833' while a pressure-relief valve is shown at 845. When the star wheel is rotated in the clockwise sense by the stalks, the drum 841 is rotated correspondingly (arrow 843) so that the follower 831 is angularly displaced to force the ball valve 842 into the nozzle 832' until the finger 831a engages the front end of this nozzle. Valve member 842 is thus shifted against the pressure of the air in line 833. Rotation of the follower 831 in the opposite sense is effected by the air pressure in the nozzle. Other valve arrangements, e.g. using vanes or the like may also be employed. Ribs 844 serve to guide the valve member 842.

An advantage of the system described in connection with FIGS. 10–19 is that the movable link members 313a, 413a, etc. allow adjustment of the position of at least the star wheels 312, 412, etc. over a wide range without requiring large-diameter star wheels. Also, the positioning of the star wheels 311 and 312; 411, 412; etc. in the same horizontal plane has been found to be especially effective for the overturned crops, while the pneumatic detecting arrangement has been found to be highly sensitive and rapid. The effluent air, under pressure, also serves to keep the sensing system clean.

The improvement described and illustrated is believed to admit of many modifications within the ability of persons skilled in the art, all such modifications being considered within the spirit and scope of the invention except as limited by the appended claims.

I claim:

1. In an agricultural harvesting machine having a mowing assembly adapted to cut a swath upon movement of the machine parallel to a stalk line adapted to define the swath, and steering means for adjusting the course of said machine along said swath, the improvement which comprises a sensing head forwardly of said mowing assembly and including at least two rotatable wheels offset from one another transversely of said stalk line and having toothed peripheries engageable with the stalks thereof upon movement of said machine along said swath; and means responsive to rotation of one of said wheels only, to both said wheels jointly and to neither of said wheels for operating said stering means to correct the course of said machine upon engagement of both said wheels with said stalk line and upon withdrawal of both said wheels from engagement with said stalk line.

2. The improvement defined in claim 1 wherein the peripheries of said wheels are offset transversely to said stalk line.

3. The improvement defined in claim 2 wherein the axes of rotation of said wheels are offset transversely to said stalk line.

4. The improvement defined in claim 2 wherein said wheels have different diameters.

5. The improvement defined in claim 1 wherein the means responsive to rotation of said wheels includes a respective follower operatively coupled to each of said wheels for movement upon the inception of movement of the respective wheel; and output means controlled by each of said followers.

6. The improvement defined in claim 5 wherein each follower includes magnetic means rotatably entrained with each of said wheels, said follower including an angularly displaceable magnetically permeable member capable of generating a torque in response to rotation of the magnetic means.

7. The improvement defined in claim 5 wherein each follower is coupled with the respective wheel by a friction clutch.

8. The improvement defined in claim 5 wherein said output means includes an electric switch for controlling said steering means.

9. The improvement defined in claim 5 wherein said output means includes a magnetic detector, said follower being provided with a magnetically permeable member adapted to control said detector.

10. The improvement defined in claim 5 wherein said output means includes pneumatic pressure-responsive means for controlling said steering means, means for delivering pneumatic fluid under pressure to said pressure-responsive means, and nozzle means connected with said pressure-responsive means and co-operating with said follower for controlling the pressure therein.

11. The improvement defined in claim 1 wherein said wheels have teeth formed with downwardly extending projections engageable with overturned crop.

12. The improvement defined in claim 1, further comprising an outrigger arm mounted on said machine and carrying said head at an extremity thereon, and adjusting means for displacing said arm in a generally horizontal direction transversely of said stalk line.

13. The improvement defined in claim 12, further comprising feedback means connected with said steering means for controlling said adjusting means to reposition said head relative to said stalk line upon the initiation of a corresponding correction in the course of said machine.

14. The improvement defined in claim 13 wherein said adjusting means includes pivot means forming a vertical pivot axis for said arm, and a servocylinder connected with said arm for swinging same toward and away from the stalk line.

15. The improvement defined in claim 13 wherein said arm is mounted upon said mowing assembly, said adjusting means including a servocylinder for shifting said assembly transversely of said stalk line.

16. The improvement defined in claim 1 including a parallelogrammatic linkage connecting said assembly to said machine.

17. The improvement defined in claim 13, further comprising stabilizer means connected with said feedback means for controlling the position of said adjusting means in accordance with a mean course correction of said steering means, thereby precluding modification of the position of said head upon minor deviation of said machine from regular travel along said swath.

18. The improvement defined in claim 17 wherein said adjusting means includes a hydraulic slave cylinder, said steering means includes a hydraulic-power cylinder and a piston rod connected with steerable wheels of said machine, said feedback means including a transmittting cylinder coupled with said slave cylinder, a servocontrol valve having a piston operatively connected with said transmitting cylinder and a plunger slidably received in said piston and forming a valve therewith, said plunger following the movement of said piston rod, said stabilizer means including a hydraulic damper with an adjustable throttle between said piston rod and said plunger for dissipating minor perturbations in said steering means.

19. The improvement defined in claim 18, further comprising means responsive to the velocity of said machine far adjusting said throttle.

20. The improvement defined in claim 18, further comprising thermostat means operatively connected to said throttle for controlling same in accordance with the temperature of fluid in said valve.

21. The improvement defined in claim 1, further comprising an outrigger arm carrying said head, and means for selectively raising and lowering said arm relative to the ground surface.

22. The improvement defined in claim 21 wherein the last-mentioned means includes a parallelogrammatic linkage for maintaining said arm parallel to itself.

23. The improvement defined in claim 21 wherein said assembly is formed with an upwardly opened stalk divider, the last-mentioned means including a mechanism for swinging said arm about a substantially horizontal axis into a retracted position in said stalk divider.

24. The improvement defined in claim 23, further comprising means for rotating said head relatively to said assembly to bring said head into a vertical plane upon its retraction into said stalk divider.

25. The improvement defined in claim 21 wherein said head and said arm are mounted upon said assembly and the last-mentioned means includes a mechanism for raising and lowering said assembly.

26. The improvement defined in claim 1, further comprising an outrigger arm mounted on said machine and supporting said head, and resilient means on said arm yieldably biasing said head toward the ground.

27. The improvement defined in claim 21 wherein said head further comprises a horizontally shiftable link carrying the wheel proximal to said stalk line, said link being movable toward and away from said stalk line.

28. The improvement defined in claim 27, further comprising means forming a stop for said link limiting its displacement in the direction of said stalk line and spring means biasing said link against said stop.

29. The improvement defined in claim 1, further comprising means on said head for stripping entrained stalks from said wheels upon the rotation thereof.

30. The improvement defined in claim 1 wherein one of said heads is provided on each side of said moving assembly, said improvement further comprising means for selectively rendering said heads effective.

References Cited
UNITED STATES PATENTS

| | | | |
|---|---|---|---|
| 2,981,355 | 4/1961 | Rabuse | 56CR Dig. |
| 3,038,544 | 6/1962 | Richey et al. | 56CR Dig. |
| 3,326,319 | 6/1967 | Schmidt | 180—79.2 |
| 3,425,197 | 2/1969 | Kita | 56CR Dig. |
| 3,430,723 | 3/1969 | Brooks | 56CR Dig. |
| 3,461,967 | 8/1969 | Wells | 56CR Dig. |

LOUIS G. MANCENE, Primary Examiner

J. A. OLIFF, Assistant Examiner

U.S. Cl. X.R.

180—79.2